W. F. PAGETT.
Harrow.
No. 10,863.
Patented May 2, 1854.
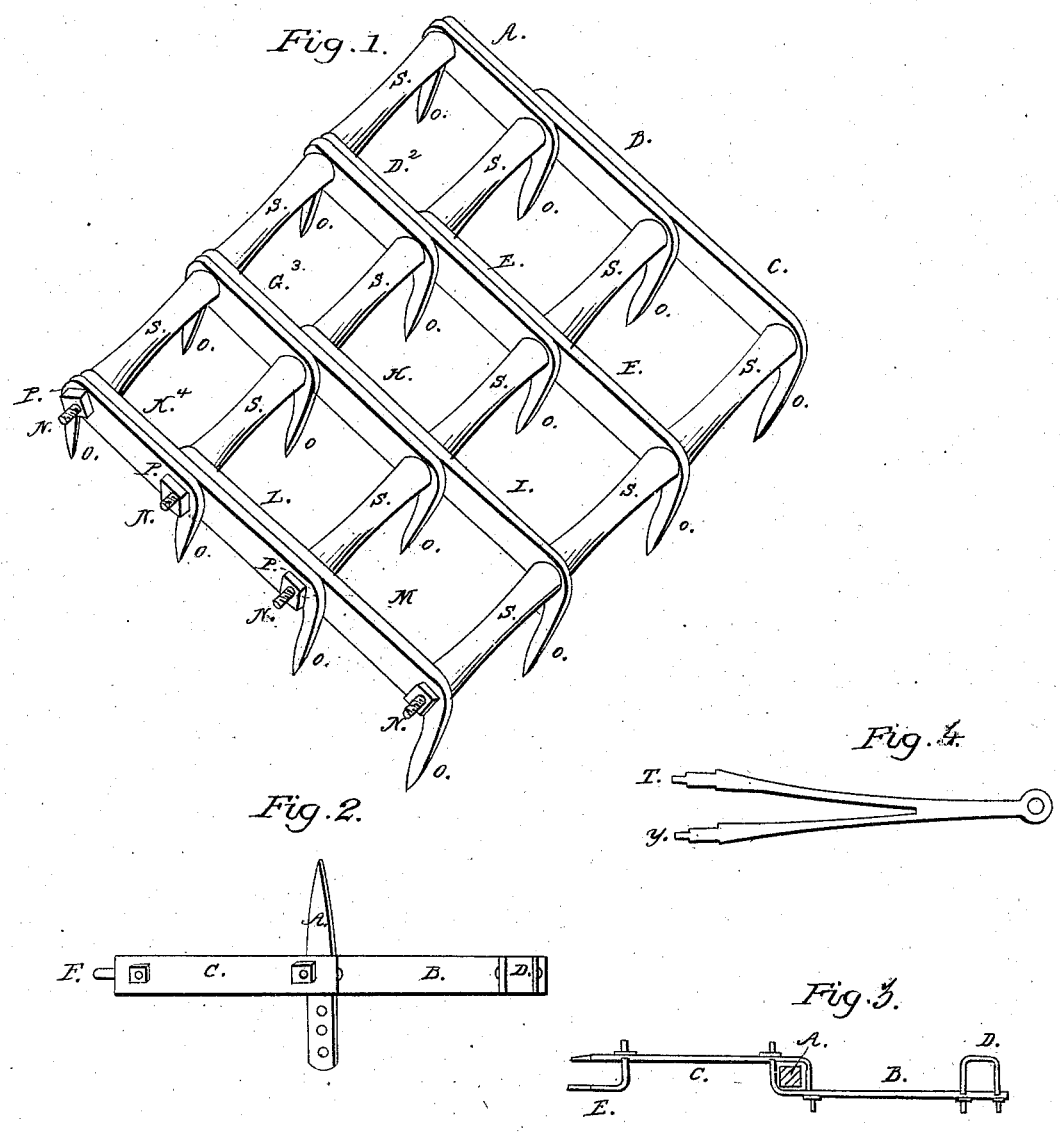

UNITED STATES PATENT OFFICE.

WASHINGTON F. PAGETT, OF STONE BRIDGE, VIRGINIA.

IMPROVEMENT IN HARROWS.

Specification forming part of Letters Patent No. 10,863, dated May 2, 1854.

*To all whom it may concern:*

Be it known that I, WASHINGTON F. PA-GETT, of Stone Bridge, in the county of Clarke and State of Virginia, have invented a new Improvement in Harrows; and I do hereby declare that the following is a full and exact description thereof, reference being had to the annexed drawings, and to letters of reference marked thereon.

The nature of my invention consists in constructing a harrow so as to admit iron as a proper material for either or all its parts, taking into consideration the economy of making and the facility of detaching for repairs or transportation, and convenience of increasing its extent and capacity, its strength and durability.

To enable others skilled in the art to make and use my invention, I will proceed to describe its construction and operation.

My improvement is applicable to harrows of any known form; but I have exhibited a square or right-angle harrow in the following drawings, in which—

At Figure 1, A B C are the sections of beam No. 1. D E F are the sections of beam No. 2. G H I are the sections of beam No. 3. K L M are the sections of beam No. 4. S S S S S S S S S S S S are pipes or tubes. N N N N are cross-rods. P P P P are screw-taps. O O O O O O O O O O O O O O are teeth.

The front section of beam No. 1 is made of a strap or bar of iron about a half-inch thick, about two inches wide, and about eleven inches long, with a right-angle projection falling from each end. The projections are about six inches long, drawn to about one and one-fourth inches diameter, square or somewhat flat, if desired, at the center, and tapering downward to a point, forming the teeth. The second section of beam No. 1 has a projection at one end only. The horizontal portion is about one foot and ten inches long, about two inches wide, and about a half-inch thick. The third section is a little longer than the second, and otherwise like it.

The description just given of the sections of beam No. 1 apply to the sections of beams No. 2, No. 3, and No. 4.

The four beams are connected as a framework by the cross-rods passing through holes in each of the several beams nearly over the teeth. The second section laps on the first, and the third section laps on the second and so far over the first that one of the cross-rods pass through three sections at that point. The forward end of the second and third sections may be thinner where they lap.

To increase the extent and capacity of the harrow, one or more sections, with their corresponding rods, pipes, and teeth, may be added, and also an additional beam or beams. The pipes or tubes, or any equivalents, are intended to keep the beams firm and at proper distances from each other. If the shape of the harrow is changed, the ends of the pipes must be sloped or beveled to suit the position of the beams. The cross-rods are about four feet long and about five-eighths of an inch diameter, having a head at one end and a screw and tap at the other. They will vary in length according to the width of the harrow. The teeth will stand about ten inches apart in the beam, and the beams are about one foot apart. A chain or clevis may be attached to the pipe or tube bearing against the front of beam No. 4. By reversing the position of the beams two sections with teeth at each end will make one beam, the end of one section lapping to the middle of the other. If the second beam be longer than the first, and the third and fourth be proportionately increased in length, the harrow will be widest behind, as some prefer.

Having thus described my invention, the manner of making, and the operation thereof, what I claim as my invention, and desire to secure by Letters Patent, is—

1. The constructing harrow-beams of sections of iron, with the teeth wrought solid upon and with them.

2. The combination therewith and arrangement of cross-rods, with screws and taps and pipes or tubes, or their equivalents, to keep the beams and sections in their places.

WASHINGTON F. PAGETT.

Witnesses:
JOHN L. SMITH,
B. B. HUGHES.